United States Patent
Matsushita

(10) Patent No.: US 12,530,963 B2
(45) Date of Patent: Jan. 20, 2026

(54) INFORMATION DISTRIBUTION DEVICE AND NAVIGATION SYSTEM

(71) Applicant: TOYOTA JIDOSHA KABUSHIKI KAISHA, Toyota (JP)

(72) Inventor: Makoto Matsushita, Ichinomiya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 126 days.

(21) Appl. No.: 18/481,639

(22) Filed: Oct. 5, 2023

(65) Prior Publication Data
US 2024/0212487 A1    Jun. 27, 2024

(30) Foreign Application Priority Data
Dec. 21, 2022 (JP) ................................. 2022-204708

(51) Int. Cl.
*G08G 1/01*    (2006.01)
*G01C 21/00*   (2006.01)
*G08G 1/052*   (2006.01)

(52) U.S. Cl.
CPC ....... *G08G 1/0141* (2013.01); *G01C 21/3841* (2020.08); *G08G 1/01* (2013.01);
(Continued)

(58) Field of Classification Search
CPC .. G08G 1/0141; G08G 1/0112; G08G 1/0133; G08G 1/052; G08G 1/01; G08G 1/096716; G01C 21/3841
See application file for complete search history.

(56) References Cited

U.S. PATENT DOCUMENTS

2006/0167626 A1   7/2006  Hashizume
2007/0229309 A1*  10/2007  Tomita ............. G08G 1/096844
                                                        340/992
(Continued)

FOREIGN PATENT DOCUMENTS

JP    2002083391 A  *  3/2002
JP    2006-201122 A     8/2006
(Continued)

OTHER PUBLICATIONS

JP 2002-083391 A, System of coping with congestion in service area and method of coping with congestion, Kaneshiro, Filed: Sep. 7, 2000 Pub: Mar. 22, 2002, English Translation (Year: 2002).*

*Primary Examiner* — Jason Holloway
*Assistant Examiner* — Benjamin J Brosh
(74) *Attorney, Agent, or Firm* — SoraIP, Inc.

(57) ABSTRACT

The information distribution device includes a communication unit that communicates with a navigation device that notifies a user of traffic congestion information, probe data obtained from one or more probe vehicles that move on a road including at least two lanes having a common traveling direction, and store data related to a store facing a specific lane that is one of the at least two lanes, and a control unit that, when detecting a traffic congestion due to a waiting for entry into the store on a specific lane, distributes information indicating that the traffic congestion is occurring and that the traffic congestion is caused by a waiting for entry into the store, as traffic congestion information, to the navigation device via the communication unit.

3 Claims, 4 Drawing Sheets

(52) U.S. Cl.
CPC ......... *G08G 1/0112* (2013.01); *G08G 1/0133* (2013.01); *G08G 1/052* (2013.01)

(56) References Cited

U.S. PATENT DOCUMENTS

| | | | |
|---|---|---|---|
| 2013/0275033 A1* | 10/2013 | Bastiaensen | G01C 21/26 |
| | | | 701/119 |
| 2015/0312327 A1* | 10/2015 | Fowe | G01S 17/86 |
| | | | 701/426 |
| 2016/0063857 A1* | 3/2016 | Fowe | G08G 1/0133 |
| | | | 701/117 |
| 2016/0076899 A1* | 3/2016 | Macneille | G08G 1/09685 |
| | | | 701/428 |
| 2017/0352262 A1* | 12/2017 | Xu | G08G 1/0133 |
| 2019/0189004 A1* | 6/2019 | Suzuki | G08G 1/0112 |
| 2019/0325738 A1* | 10/2019 | Dorum | G08G 1/0129 |
| 2020/0124439 A1* | 4/2020 | Fowe | G06V 20/56 |
| 2020/0292338 A1* | 9/2020 | Fowe | G01C 21/3461 |
| 2021/0104155 A1* | 4/2021 | Xu | B60W 50/14 |
| 2022/0207995 A1* | 6/2022 | Fowe | G06F 16/29 |
| 2022/0223038 A1* | 7/2022 | Chikamori | G08G 1/096775 |
| 2023/0204376 A1* | 6/2023 | Fowe | G08G 1/052 |
| 2024/0067214 A1* | 2/2024 | Nagasaka | G01C 21/3492 |
| 2024/0194059 A1* | 6/2024 | Huang | G08G 1/096741 |

FOREIGN PATENT DOCUMENTS

| | | |
|---|---|---|
| JP | 2006-300771 A | 11/2006 |
| JP | 2021-047544 A | 3/2021 |
| JP | 2021-124925 A | 8/2021 |

* cited by examiner

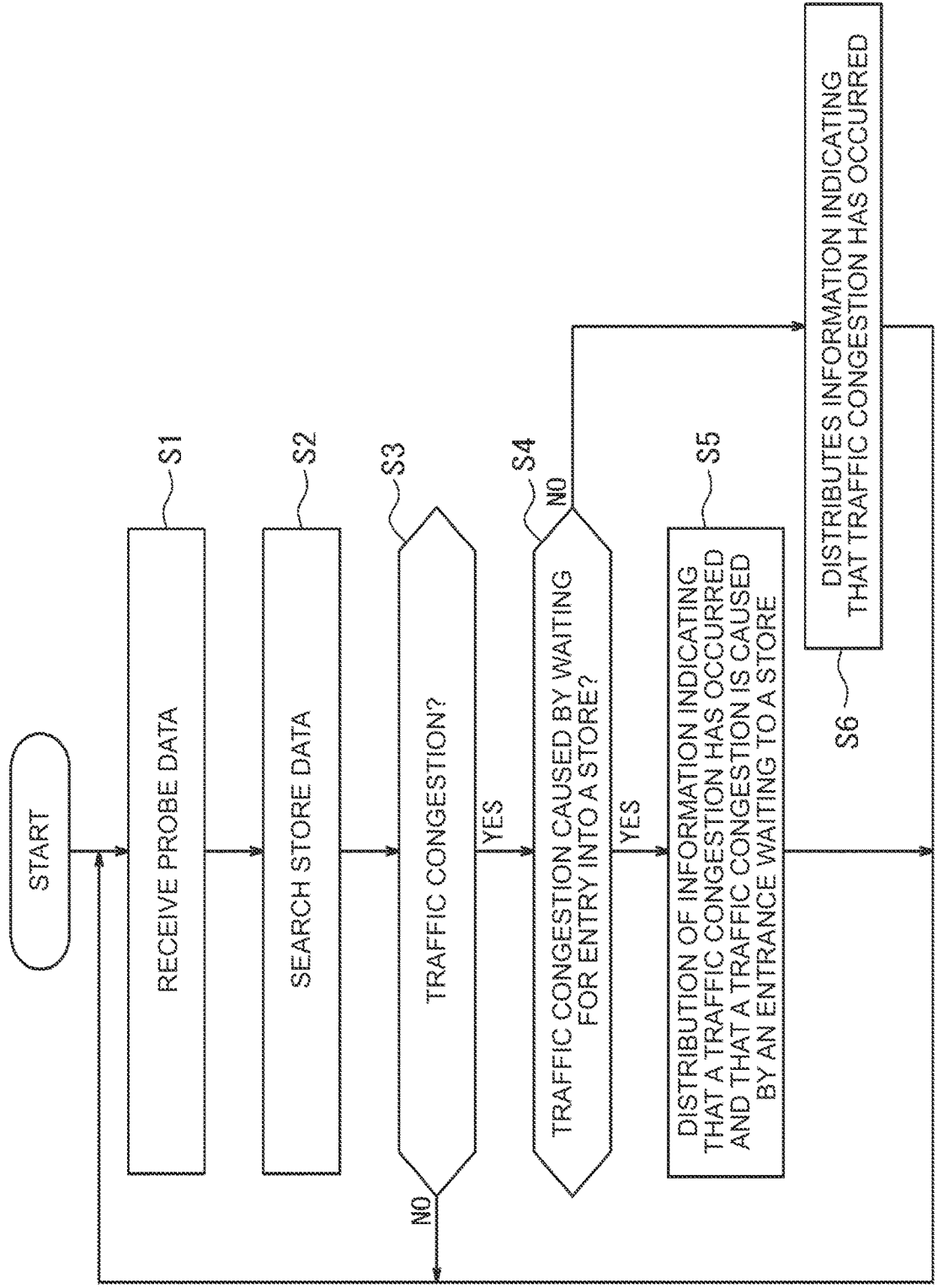

INFORMATION DISTRIBUTION DEVICE AND NAVIGATION SYSTEM

CROSS-REFERENCE TO RELATED APPLICATION

This application claims priority to Japanese Patent Application No. 2022-204708 filed on Dec. 21, 2022, incorporated herein by reference in its entirety.

BACKGROUND

1. Technical Field

The present disclosure relates to an information distribution device and a navigation system.

2. Description of Related Art

Japanese Unexamined Patent Application Publication No. 2021-047544 (JP 2021-047544 A) discloses a navigation system in which, on a route to a destination, when a probe vehicle takes a route to turn left on a road having two lanes on each side, at an intersection, and traffic congestion has occurred due to another vehicle that enters a store before the intersection, traveling in a right lane is guided before a traffic congestion area, and a lane change from the right lane to a left lane is guided at a timing when the probe vehicle passes an entrance of the store.

SUMMARY

In the conventional navigation system, even when the traffic congestion has occurred due to a vehicle that enters the store, on the road having two lanes on each side, the reason for only one lane being congested is uncertain.

An object of the present disclosure is to make it possible to make the reason for occurrence of traffic congestion clear, when the traffic congestion has occurred due to a vehicle that enters a store.

An information distribution device according to the present disclosure includes: a communication unit that communicates with a navigation device that notifies a user of traffic congestion information; and a control unit that distributes, via the communication unit to the navigation device, information indicating that traffic congestion has occurred and that the traffic congestion is caused by waiting of entry to a store as the traffic congestion information, when the traffic congestion due to the waiting of the entry to the store is detected at a specific lane with reference to probe data obtained from at least one probe vehicle moving on a road including at least two lanes with a common traveling direction and store data relating to the store facing the specific lane that is one of the at least two lanes.

According to the present disclosure, when the traffic congestion occurs due to the vehicle that enters the store, the reason for the occurrence of the traffic congestion can be clear.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein:

FIG. 4 is a flow chart showing an operation of the information distribution device according to the embodiment of the present disclosure.

DETAILED DESCRIPTION OF EMBODIMENTS

Hereinafter, an embodiment of the present disclosure will be described with reference to the drawings.

In each drawing, the same or corresponding portions are denoted by the same reference signs. In the description of the present embodiment, description of the same or corresponding components will be appropriately omitted or simplified.

Figure 1:
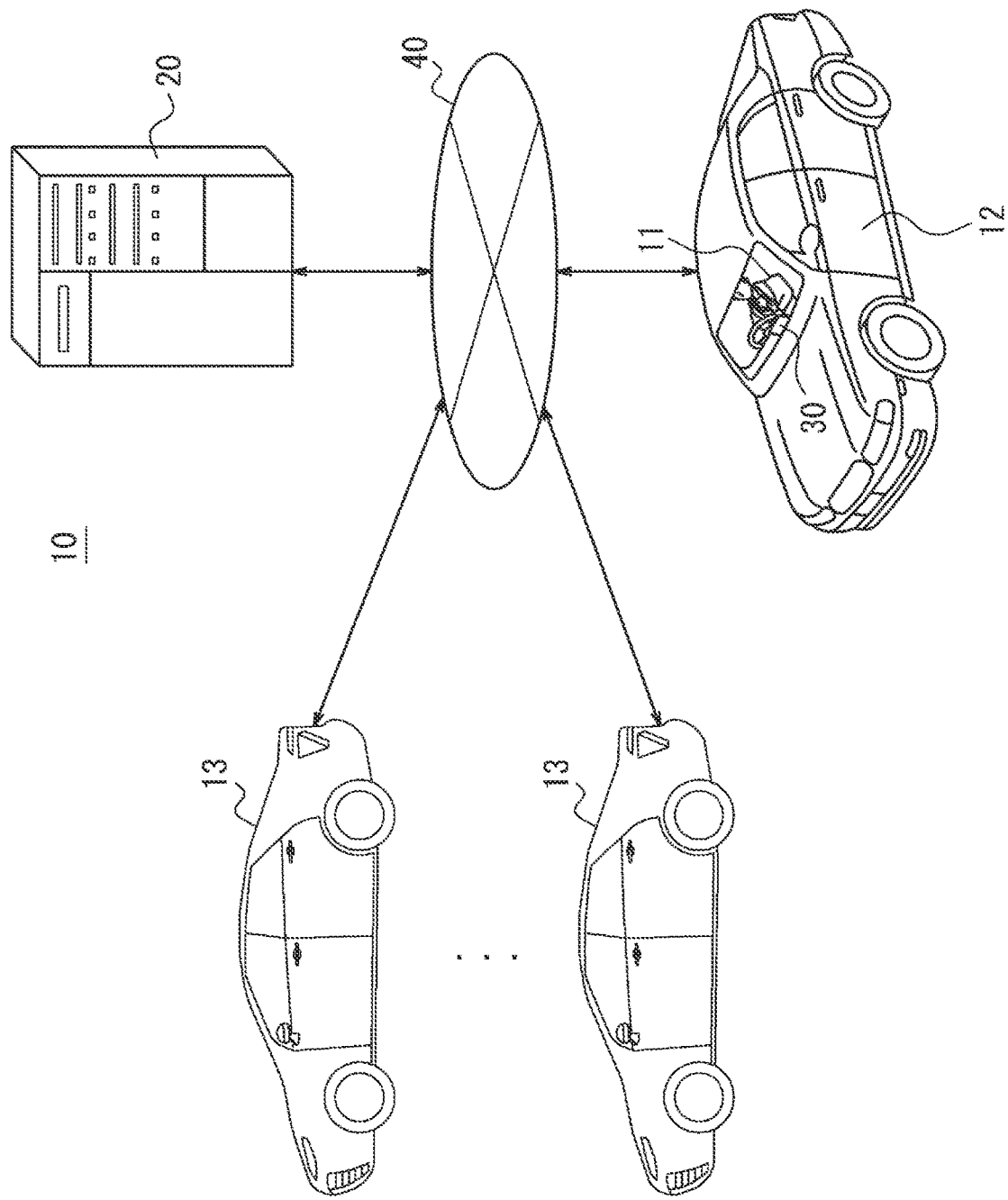
FIG. 1 is a diagram illustrating a configuration of a navigation system according to an embodiment of the present disclosure.

A configuration of the navigation system 10 according to the present embodiment will be described with reference to FIG. 1.

The navigation system 10 includes an information distribution device 20 and a navigation device 30. The information distribution device 20 can communicate with the navigation device 30 via the network 40. The information distribution device 20 can also communicate with a plurality of probe vehicles 13 via the network 40.

The information distribution device 20 is installed in a facility such as a data center, and is operated by a provider that provides an information distribution service. The information distribution device 20 is a computer such as a server belonging to a cloud computing system or another computing system.

The navigation device 30 is mounted on the vehicle 12 and is used by the user 11 riding on the vehicle 12. The navigation device 30 is an in-vehicle device having a function of guiding a route to a destination to the user 11, such as a car navigation device. Alternatively, the navigation device 30 may be connected to the vehicle 12 as an external device or may be held by the user 11. The navigation device 30 may be a mobile device having a function of guiding a route to a destination to the user 11, such as a mobile phone, a smartphone, or a tablet in which a map application is installed.

Vehicle 12 may be any type of vehicle, such as, for example, a gas-powered vehicle, a diesel-powered vehicle, a HEV, PHEV, BEV, or a FCEV. "HEV" is an abbreviation for hybrid electric vehicle. "PHEV" is an abbreviation for plug-in hybrid electric vehicle. "BEV" is an abbreviation for battery electric vehicle. "FCEV" is an abbreviation for fuel cell electric vehicle. The vehicle 12 is driven by the user 11 in the present embodiment, but the driving may be automated at an arbitrary level. The level of autonomous driving is, for example, one of levels 1 to 5 in the SAE leveling, for example. "SAE" is an abbreviation for Society of Automotive Engineers. The vehicle 12 may be a MaaS dedicated vehicle. "MaaS" is an abbreviation for Mobility as a Service.

Multiple probe vehicles 13 are any type of vehicle, such as a gasoline-powered vehicle, a diesel-powered vehicle, a hydrogen-powered vehicle, HEV, PHEV, BEV, or FCEV. In the present embodiment, the plurality of probe vehicles 13 are driven by a driver, but the driving may be automated at an arbitrary level. The level of autonomous driving is, for example, one of levels 1 to 5 in the SAE leveling, for example. The plurality of probe vehicles 13 may be MaaS dedicated vehicles.

The network 40 includes the Internet, at least one WAN, at least one MAN, or any combination thereof. "WAN" is an abbreviation for wide area network. "MAN" is an abbreviation for metropolitan area network. The network 40 may include at least one wireless network, at least one optical network, or any combination thereof. The wireless network is, for example, an ad hoc network, a cellular network, a wireless LAN, a satellite communication network, or a terrestrial microwave network. "LAN" is an abbreviation for local area network.

Figure 2:
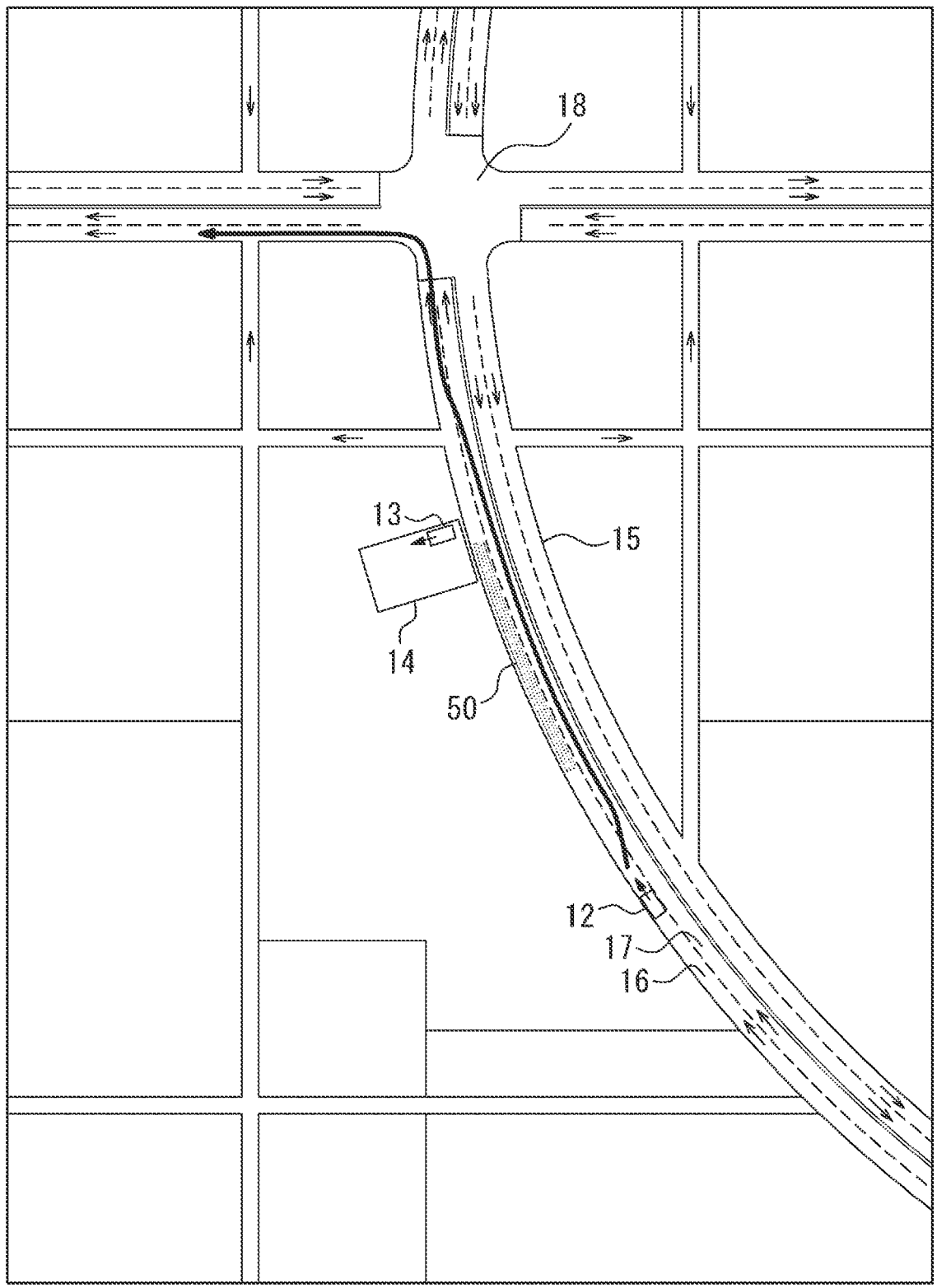
FIG. 2 is a diagram illustrating an example of a traffic congestion caused by waiting for entry into a store.

The outline of the present embodiment will be described with reference to FIG. 1 and FIG. 2.

The information distribution device 20 refers to probe data obtained from one or more probe vehicles 13 moving on a road 15 including at least two lanes having a common traveling direction, and store data related to the store 14 facing the specific lane 16, which is one of the at least two lanes. When the information distribution device 20 detects the traffic congestion 50 caused by the entrance waiting to the store 14 in the specific lane 16, it distributes information indicating that the traffic congestion 50 is occurring and that the traffic congestion 50 is caused by the entrance waiting to the store 14 to the navigation device 30 as the traffic congestion information. The navigation device 30 notifies the user 11 of the traffic congestion information.

In the present embodiment, it is conceivable that it takes time to enter the store 14, such as a drive-through of a fast food shop, and only the specific lane 16, such as the left lane of the road 15, is congested. In this case, the information distribution device 20 can determine that the cause of the traffic congestion 50 is an entry into the store 14 by associating the probe data with the store data. As a result, it is possible to express the traffic congestion clearly, such as "only the left lane is congested to wait for the entrance to the store". That is, according to the present embodiment, when the traffic congestion 50 caused by the vehicle entering the store 14 is occurring, the reason for the occurrence of the traffic congestion 50 is known.

In the present embodiment, when the vehicle 12 on which the user 11 is riding is moving the specific lane 16 in a direction approaching the store 14 and the traffic congestion information is received from the information distribution device 20, the navigation device 30 notifies the user 11 of the traffic congestion information and guides the lane change or the detour route. For example, as illustrated in FIG. 2, since the user 11 wants to turn left at the intersection 18 ahead of the store 14, it is assumed that the specific lane 16 is moved by the vehicle 12. If only the specific lane 16 is congested, it is not known whether the traffic congestion has occurred in the left turn waiting at the intersection 18, or whether the traffic congestion has actually occurred only in the waiting for the entry to the store 14, and the intersection 18 at the destination is not congested. If there is a traffic congestion waiting for a left turn at the intersection 18, the user 11 should align with the traffic congestion train. On the other hand, if there is a traffic congestion waiting for entry into the store 14, the user 11 should change the lane to the adjacent lane 17, avoid the traffic congestion train, and then return to the specific lane 16. According to the present embodiment, the information distribution device 20 can determine the cause of the traffic congestion based on the probe data from the probe vehicle 13 and the store data related to the store 14. Therefore, the navigation device 30 can notify the user 11 of the reason for the occurrence of the traffic congestion in addition to the guidance that the traffic congestion has occurred.

Figure 3:
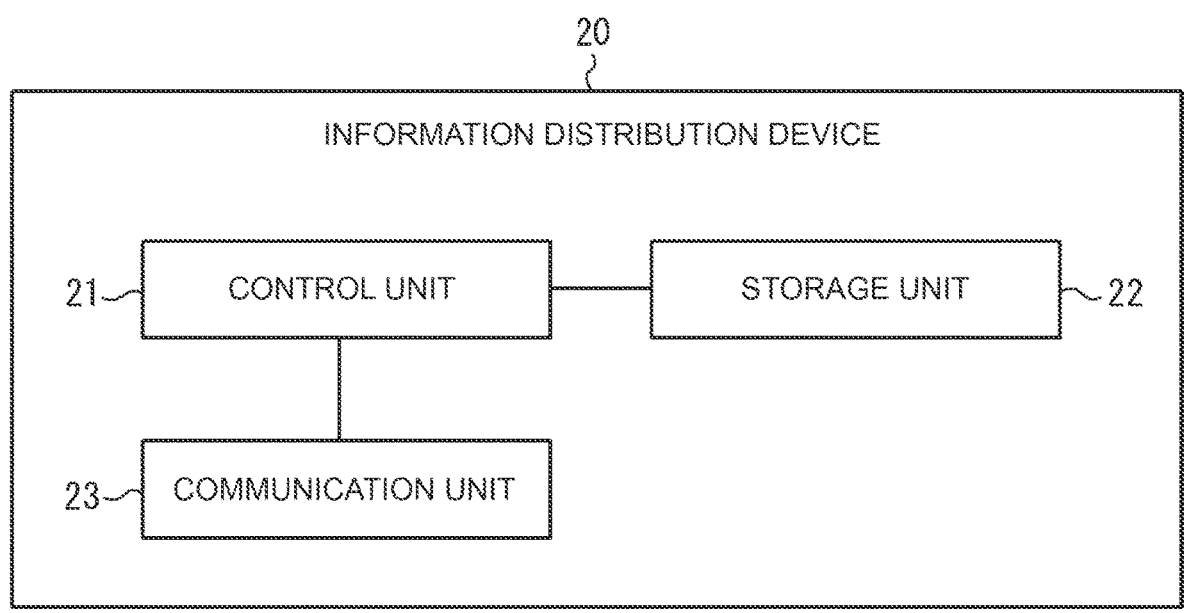
FIG. 3 is a block diagram illustrating a configuration of an information distribution device according to an embodiment of the present disclosure.

With reference to FIG. 3, the configuration of the information distribution device 20 according to the present embodiment will be described.

The information distribution device 20 includes a control unit 21, a storage unit 22, and a communication unit 23.

The control unit 21 includes at least one processor, at least one programmable circuit, at least one dedicated circuit, or any combination thereof. The processor is a general-purpose processor such as a CPU or a GPU, or a dedicated processor specialized for a specific process. "CPU" is an abbreviation for central processing unit.

"GPU" is an abbreviation for graphics processing unit. The programmable circuit is, for example, an FPGA. "FPGA" is an abbreviation for field-programmable gate array. The dedicated circuit is, for example, an ASIC. The term "ASIC" is an abbreviation for "application specific integrated circuit". The control unit 21 executes processing related to the operation of the information distribution device 20 while controlling each unit of the information distribution device 20.

The storage unit 22 includes at least one semiconductor memory, at least one magnetic memory, at least one optical memory, or any combination thereof. The semiconductor memory is, for example, a RAM, a ROM, or a flash memory. "RAM" is an abbreviation for random access memory. "ROM" is an abbreviation for read only memory. The RAM is, for example, an SRAM or a DRAM. "SRAM" is an abbreviation for static random access memory. "DRAM" is an abbreviation for dynamic random access memory. The ROM is, for example, an EEPROM. "EEPROM" is an abbreviation for electrically erasable programmable read only memory. The flash memory is, for example, an SSD. "SSD" is an abbreviation for solid-state drive. The magnetic memory is, for example, an HDD. "HDD" is an abbreviation for hard disk drive. The storage unit 22 functions as, for example, a main storage device, an auxiliary storage device, or a cache memory. The storage unit 22 stores data used for the operation of the information distribution device 20 and data obtained by the operation of the information distribution device 20.

The communication unit 23 includes at least one communication interface. The communication interface is, for example, an interface compatible with a wired LAN communication standard such as Ethernet (registered trademark) or a radio LAN communication standard such as IEEE802.11. "IEEE" is an abbreviation for Institute of Electrical and Electronics Engineers. The communication unit 23 communicates with the navigation device 30. The communication unit 23 also communicates with a plurality of probe vehicles 13. The communication unit 23 receives data used for the operation of the information distribution device 20 and transmits data obtained by the operation of the information distribution device 20.

The function of the information distribution device 20 is realized by executing the program according to the present embodiment by a processor serving as the control unit 21. That is, the function of the information distribution device 20 is realized by software. The program causes the computer to execute the operation of the information distribution device 20, thereby causing the computer to function as the information distribution device 20. That is, the computer functions as the information distribution device 20 by executing the operation of the information distribution device 20 in accordance with the program.

The program can be stored in a non-transitory computer-readable medium. The non-transitory computer-readable medium is, for example, a flash memory, a magnetic recording device, an optical disc, an opto-magnetic recording medium, or a ROM. The distribution of the program is carried out, for example, by selling, transferring, or renting a portable medium such as an SD card, a DVD, or a CD-ROM in which the program is stored. "SD" is an abbreviation for Secure Digital. "DVD" is an abbreviation for digital versatile disc. "CD-ROM" is an abbreviation for compact disc read only memory. The program may be stored in the storage of the server and transferred from the server to other computers to distribute the program. The program may be provided as a program product.

The computer temporarily stores the program stored in the portable medium or the program transferred from the server in the main storage device, for example. The computer then causes the processor to read the program stored in the main storage device, and causes the processor to execute processes in accordance with the read program. The computer may read the program directly from the portable medium and execute processes in accordance with the program. The computer may execute the processes in accordance with the received program each time the program is transferred from the server to the computer.

The processes may be executed by a so-called ASP service that realizes the function only by execution instruction and result acquisition without transferring the program from the server to the computer. "ASP" is an abbreviation for application service provider. The program includes information that is used for processing by electronic computers and equivalent to a program. For example, data that is not a direct command to a computer but has the property of defining the processing of the computer corresponds to the "data equivalent to a program".

Some or all of the functions of the information distribution device 20 may be realized by a programmable circuit or a dedicated circuit as the control unit 21. That is, some or all of the functions of the information distribution device 20 may be realized by hardware.

The operation of the information distribution device 20 according to the present embodiment will be described with reference to FIG. 4. This operation corresponds to the information distribution method according to the present embodiment.

In S1, the control unit 21 receives probe data from one or more probe vehicles 13 moving on a road 15 including at least two lanes having the same traveling direction via the communication unit 23. The probe data includes information such as the type of the road 15 and the position and speed of the probe vehicle 13.

In S2, the control unit 21 searches for store data. The store data may be stored in advance in the storage unit 22 or may be stored in an external storage that can be connected to the communication unit 23. The store data includes data relating to the store 14 facing the specific lane 16, which is one of at least two lanes of the road 15. Specifically, the store data includes data indicating the address and the business hours of the store 14.

In S3, the control unit 21 refers to the probe data received by S1 to determine whether or not a traffic congestion has occurred in the specific lane 16. As a method of detecting a traffic congestion by probe data, a known method can be used. When it is determined that no traffic congestion has occurred in the specific lane 16, that is, when no traffic congestion has been detected in the specific lane 16, S1 process is executed again. When it is determined that a traffic congestion has occurred in the specific lane 16, that is, when a traffic congestion is detected in the specific lane 16, S4 process is executed.

In S4, the control unit 21 determines whether or not the traffic congestion detected by S3 is the traffic congestion 50 caused by the waiting for the entry into the store 14, by referring to at least the store data searched by S2.

In the present embodiment, referring to the probe data received by S1, the control unit 21 determines whether or not the moving speed of the probe vehicle 13 moving in the specific lane 16 becomes slow prior to the probe vehicle 13 passing through the store 14, and the moving speed of the probe vehicle 13 becomes fast after the probe vehicle 13 passing through the store 14. Thus, the control unit 21 determines whether or not the traffic congestion 50 has occurred. For example, it is assumed that the probe vehicle V1 temporarily decelerates while moving the specific lane 16 toward the store 14, and the velocity of the probe vehicle V1 returns to the original velocity after the probe vehicle V1 passes through the store 14. In such a case, the control unit 21 determines that a traffic congestion 50 caused by waiting for entry into the store 14 has occurred. However, outside the business hours indicated by S2, the control unit 21 may determine that the traffic congestion 50 due to the entrance waiting to the store 14 has not occurred.

As a modification of the present embodiment, referring to the probe data received by S1, the control unit 21 determines that the moving velocity of the probe vehicle 13 moving on the specific lane 16 is slower prior to the probe vehicle 13 passing through the store 14, and that the probe vehicle 13 has entered the store 14. The control unit 21 may further refer to the situation data obtained by the camera or the sensor that captures the traffic situation ahead of the probe vehicle 13 to determine whether the traffic congestion 50 has occurred. For example, it is assumed that the probe-vehicle V2 decelerates while moving the specific lane 16 toward the store 14, and then enters the store 14 after a while. In such cases, the control unit 21 receives status data obtained when the probe vehicle V2 enters the store 14 from the probe vehicle V2 via the communication unit 23. The control unit 21 determines whether or not there is a traffic congestion in front of the probe-vehicle V2. When the front of the probe-vehicle V2 is not congested, the control unit 21 determines that the traffic congestion 50 due to the entrance waiting to the store 14 has occurred. However, outside the business hours indicated by S2, the control unit 21 may determine that the traffic congestion 50 due to the entrance waiting to the store 14 has not occurred.

As another modification of the present embodiment, the control unit 21 may determine whether or not the traffic congestion 50 has occurred based on whether or not the store 14 is within the business hours simply by referring to the data obtained by S2. For example, it is assumed that the business hours of the store 14 are from 7 a.m. to 10 p.m. In such a case, the control unit 21 determines that the traffic congestion 50 due to the entrance waiting to the store 14 has occurred between 7 a.m. and 10 p.m. On the other hand, the control unit 21 determines that the traffic congestion 50 due to the entrance to the store 14 has not occurred during the period from 10:00 p.m. to 7:00 a.m.

When it is determined that a traffic congestion 50 caused by waiting for entry into the store 14 has occurred in S4, that is, when the traffic congestion 50 is detected, S5 process is executed. When it is determined in S4 that the traffic congestion 50 due to the entrance waiting to the store 14 does not occur, that is, when the traffic congestion 50 is not detected, S6 process is executed.

In S5, the control unit 21 distributes, as the traffic congestion information, information indicating that the traffic congestion 50 is occurring and that the traffic congestion 50 is caused by the waiting for the entry into the store 14 to the navigation device 30 via the communication unit 23. The navigation device 30 notifies the user 11 of the traffic congestion information. For example, the navigation device 30 displays a message such as "only the left lane is congested to wait for entry into the store" on the display. Alternatively, the navigation device 30 may output a similar message from the speaker by voice.

In S6, the control unit 21 distributes, as the traffic congestion information, information indicating that the traffic congestion is occurring to the navigation device 30 via the communication unit 23. Alternatively, the control unit 21 may distribute, as the traffic congestion information, information indicating that the traffic congestion has occurred and that the traffic congestion is not caused by the waiting for the entry into the store 14 to the navigation device 30 via the communication unit 23. The navigation device 30 notifies the user 11 of the traffic congestion information. For example, the navigation device 30 displays a message such as "only the left lane is congested for waiting for a left turn" on the display. Alternatively, the navigation device 30 may output a similar message from the speaker by voice.

As described above, in the present embodiment, when the information distribution device 20 determines that the cause of the traffic congestion is entering the store 14 based on the probe data and the store data, the navigation device 30 notifies the user 11 that the traffic congestion 50 caused by the entry into the store 14 has occurred. According to the present embodiment, since the reason for the occurrence of the traffic congestion is known, it is possible to appropriately deal with a lane change, a detour, or the like. The accuracy of the determination can also be improved by considering the business hours of the store 14.

When the probe vehicle 13 does not enter the store 14, the probe vehicle 13 exits the traffic congestion when the probe vehicle 13 passes through the store 14. Therefore, the information distribution device 20 can determine that the waiting for entry into the store 14 is the cause of the occurrence of the traffic congestion. When the probe vehicle 13 enters the store 14, the situation ahead of the probe vehicle 13 is known by the camera or the sensor of the probe vehicle 13, so that the information distribution device 20 can determine that the waiting for the entry into the store 14 is the reason for the occurrence of the traffic congestion if the destination of the probe vehicle 13 is not congested.

The present disclosure is not limited to the embodiment described above. For example, two or more blocks shown in the block diagram may be integrated, or a single block may be divided. Instead of executing two or more steps shown in the flowchart in chronological order according to the description, the steps may be executed in parallel or in a different order, depending on the processing capacities of the devices that execute the steps, or as necessary. Other changes may be made without departing from the scope of the present disclosure.

What is claimed is:

1. An information distribution system comprising:
a navigation device mounted on a host vehicle; and
a server that includes
a processor; and
a memory storing executable instructions that cause the processor to
receive probe data from one or more probe vehicles traveling on a road including at least two lanes in a same traveling direction;
obtain store data that includes information relating to a store facing a specific lane of the two lanes in the same traveling direction, the store data including operating hours of the store;
determine whether traffic congestion has occurred in the specific lane due to vehicles waiting to enter the store from the specific lane, wherein the processor
determines that the traffic congestion has occurred in the specific lane due to the vehicles waiting to enter the store when the traffic congestion occurs during the operating hours indicated in the store data, and
transmits traffic congestion information to the navigation device in response to determining that the traffic congestion in the specific lane due to the vehicles waiting to enter the store has occurred;
the navigation device displays a graphical display element in a display of the navigation device in response to receiving the traffic congestion information, the graphical display element including a notification to a user of the host vehicle indicating that the traffic congestion due to the vehicles waiting to enter the store from the specific lane has occurred;
wherein the probe data received from each of the one or more probe vehicles includes information indicating a moving speed of a corresponding probe vehicle of the one or more probe vehicles; and
the processor determines that the traffic congestion due to the vehicles waiting to enter the store from the specific lane has occurred when the moving speed indicated in the probe data of the one or more probe vehicles traveling in the specific lane decreases as the probe vehicle approaches the store, and increases after the probe vehicle passes the store.

2. The information distribution system according to claim 1, wherein
the executable instructions further cause the processor to:
obtain situation data captured by a sensor that captures traffic situation information in front of a probe vehicle of the one or more probe vehicles;
the probe data received from each of the one or more probe vehicles includes information indicating a moving speed of a corresponding probe vehicle of the one or more probe vehicles; and
the processor determines that the traffic congestion due to the vehicles waiting to enter the store from the specific lane has occurred when the moving speed indicated in the probe data of the one or more probe vehicles traveling in the specific lane decreases as the one or more probe vehicles approach the store and the situation data indicates the probe vehicle has entered the store.

3. The information distribution system according to claim 1, wherein
the navigation device further provides guidance of a lane change or a detour route to a user of the host vehicle in response to receiving the traffic congestion information and the host vehicle traveling in the specific lane toward the store.

* * * * *